UNITED STATES PATENT OFFICE.

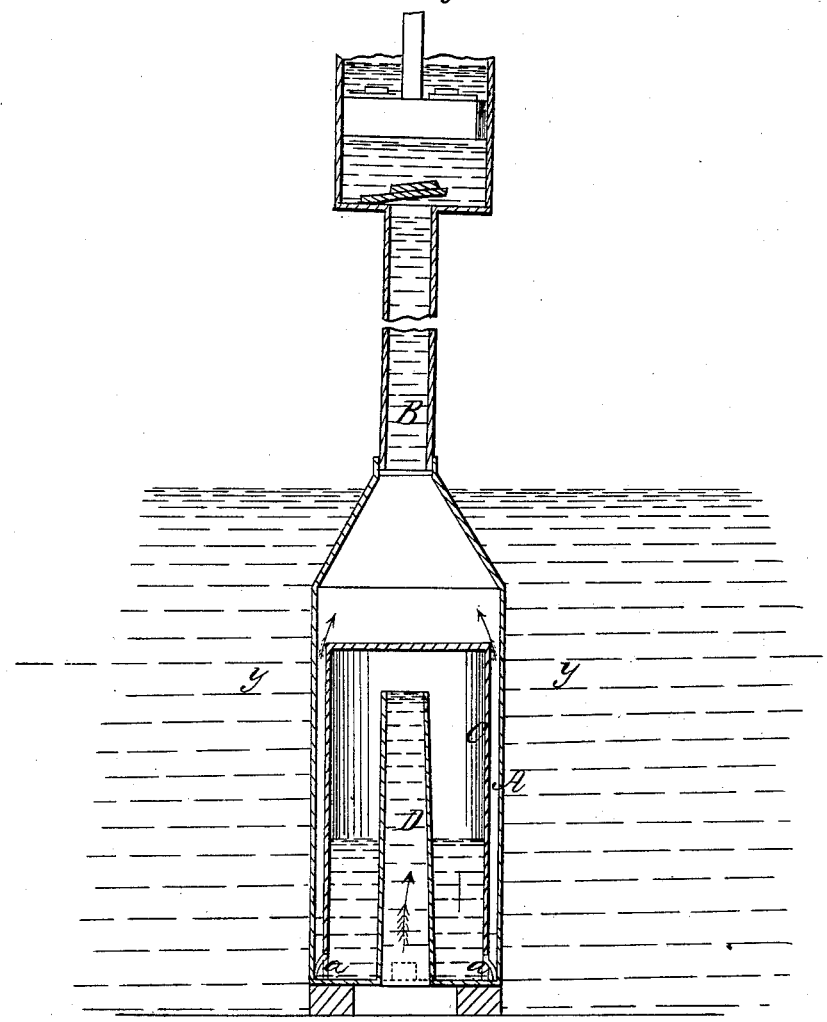
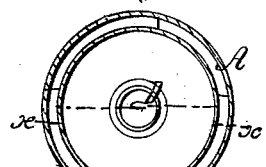

DANIEL FLAGG, OF CONCORD, NEW HAMPSHIRE.

IMPROVEMENT IN WATER-ELEVATING DEVICES.

Specification forming part of Letters Patent No. 57,306, dated August 21, 1866.

*To all whom it may concern:*

Be it known that I, DANIEL FLAGG, of Concord, in the county of Merrimack and State of New Hampshire, have invented a new and Improved Water-Elevating Device; and I do hereby declare that the following is a full, clear, and exact description thereof, which will enable those skilled in the art to make and use the same, reference being had to the accompanying drawings, forming part of this specification, in which—

Figure 1 is a vertical central section of my invention; Fig. 2, a horizontal section of the same, taken in the line $x$ $x$, Fig. 1.

Similar letters of reference indicate corresponding parts.

This invention relates to a new and useful device for assisting in elevating water from wells, cisterns, &c.; and it consists in having an air-chamber connected with the lower end of the suction-pipe of a pump, as hereinafter fully shown and described, whereby the pressure of the air within the chamber is made to counteract, in a certain degree, the gravity of the water, and thereby greatly aid in elevating the same.

A represents a vessel, which may be of any suitable dimensions, and with which the lower end of the suction tube or pipe B communicates. Within this vessel A there is placed a smaller vessel, C, the lower end of which communicates with the vessel A by means of openings $a$; and D is a tube which is fitted vertically in the vessel C, extending nearly to its upper end, and being open at the top, the top of vessel C being closed. The lower end of this tube D does not communicate with the vessel C, but passes through the bottom of the vessels A C, one bottom answering for both, said tube being open at its lower end to admit of the water passing into it.

From the above description it will be seen that when the water is drawn up through vessel A the air compressed in the vessel C will expand by its own elasticity, and will assist greatly in elevating the water.

The vessel A is submerged at the bottom of the well, cistern, or reservoir from which the water is to be drawn, for by having it at the lowest point the best effect is obtained.

Having thus described my invention, I claim as new and desire to secure by Letters Patent—

The arrangement of the vessel A, vessel C, and tube D, in combination with the suction-pipe B, constructed and operating as herein described.

DANIEL FLAGG.

Witnesses:
JOHN T. MUGRIDGE,
LUTHER S. MORRILL.